United States Patent [19]

Cezanne

[11] Patent Number: 5,518,303
[45] Date of Patent: May 21, 1996

[54] TWIN-TYPE BRAKE FORCE REGULATOR INCLUDING AN ELECTROMAGNETICALLY ACTUATED LOCKING DEVICE

[75] Inventor: Rudolph Cezanne, Gravenwiesbach, Germany

[73] Assignee: ITT Automotive Europe GmbH, Germany

[21] Appl. No.: 360,759

[22] PCT Filed: Jun. 18, 1993

[86] PCT No.: PCT/EP93/01558

§ 371 Date: Dec. 22, 1994

§ 102(e) Date: Dec. 22, 1994

[87] PCT Pub. No.: WO94/00321

PCT Pub. Date: Jan. 6, 1994

[30] Foreign Application Priority Data

Jun. 22, 1992 [DE] Germany ............... 42 20 414.3

[51] Int. Cl.⁶ ............... B06T 8/26; B06T 11/34
[52] U.S. Cl. ............... 303/9.63; 303/113.5
[58] Field of Search ............... 188/349; 303/9.63, 303/9.72, 9.75, 92, 113.5; 137/596; 251/90

[56] References Cited

U.S. PATENT DOCUMENTS 4,765,690  8/1988  Rudiger et al. ............... 303/9.75
5,251,969  10/1993  Cezanne et al. ............... 303/9.63

FOREIGN PATENT DOCUMENTS 4029332  5/1991  Germany.
4030686  4/1992  Germany.

*Primary Examiner*—David M. Mitchell
*Assistant Examiner*—Chris Schwartz
*Attorney, Agent, or Firm*—Dykema Gossett

[57] ABSTRACT

In order to prevent a twin-type brake force regulator, having a control tappet and a beam of balance, from performing its pressure reduction function, an electromagnetic locking device that avoids high cost and great expenditure in material is provided. The locking device includes an electric coil, magnet armature and locking member. The locking member is attached to the magnet armature and positioned in a radial position relative to a control piston such that the locking member can be placed in positive engagement with the control tappet. In a preferred embodiment, the locking member has a U-shaped fork with an inner diameter conformed to the control tappet. An advanced position, that is the position in which the control tappet is locked by the locking member, is defined by the position of the magnet armature when the coil is energized. A retracted position of the locking member, in which the control tappet is released, results when the magnet armature is reset, with the coil deenergized. The result is that the twin-type brake force regulator is suitable for use in anti-lock brake systems, because the pressure reduction function is deactivated as long as the anti-lock function is performed and will not be activated until the anti-lock function is disabled.

13 Claims, 2 Drawing Sheets

TWIN-TYPE BRAKE FORCE REGULATOR INCLUDING AN ELECTROMAGNETICALLY ACTUATED LOCKING DEVICE

The present invention relates to a twin-type brake force regulator of the type having two bores arranged in parallel in a housing. The bores each contain a slidable control piston. The brake force regulator also has an actuating device, including a control tappet, and a beam of balance. Twin-type regulators including a control tappet and a beam of balance are advantageous because all elements required for the actuation are positioned in the space which is free from pressure fluid. Therefore, the elements do not require additional sealing. However, this advantage can only be utilized in an electromagnetic locking device, if a number of difficulties are overcome. If the electromagnetic locking device is to be positioned in the space which is free from pressure fluid, it is not possible to have the locking device act directly on the valve closure member, as is disclosed in DE 40 29 332 A1, for example, in order to minimize the electromagnetic controlling forces. Rather, it is required in twin-type regulators actuated by a beam of balance to prevent the control pistons from performing the stroke necessary for the control operation. However, controlling forces of a like magnitude can only be generated by a particularly potent and, hence, very expensive magnet.

DE 40 30 686 A1 discloses a locking device, wherein, due to a special ramp arrangement, the electromagnet displaces a number of locking balls in the radial direction which block the stroke of the control tappet in the direction of the magnet. The result is that the control pistons are arrested and axial forces are not applied to the electromagnet, thereby preventing a control operation. However, disadvantageously, the arrangement necessitates major assembly efforts because a comparatively large number of elements, which are movable in relation to each other, have to be fitted into each other.

An object of the present invention is to equip a generic twin-type brake force regulator with an electromagnetic locking device, for which only a small number of functional elements are required. The electromagnetic locking device preferably is subjected to minor axial forces, thereby permitting low-cost manufacture of the arrangement.

Thus, the principle of the present invention is to arrange the electromagnetic locking device, which includes an electric coil, a magnet armature and a locking member attached to the magnet armature in a radial direction relative to the axes of the control pistons, and to bring the locking member into engagement with the control tappet. On the one hand, it is advantageous that the stroke forces of the control pistons act perpendicularly on the magnetic actuating forces. On the other hand, a Joint locking mechanism for both control pistons is achieved by the engagement of the locking member with the control tappet. Because only one locking member is necessary which, in addition, is rigidly coupled to the magnet armature, the assembly effort is minimized.

A detailed description of the inventive idea is given by describing one preferred embodiment with reference to three accompanying drawings.

DETAILED DESCRIPTION OF THE PREFERRED EMBODIMENTS

Figure 1:
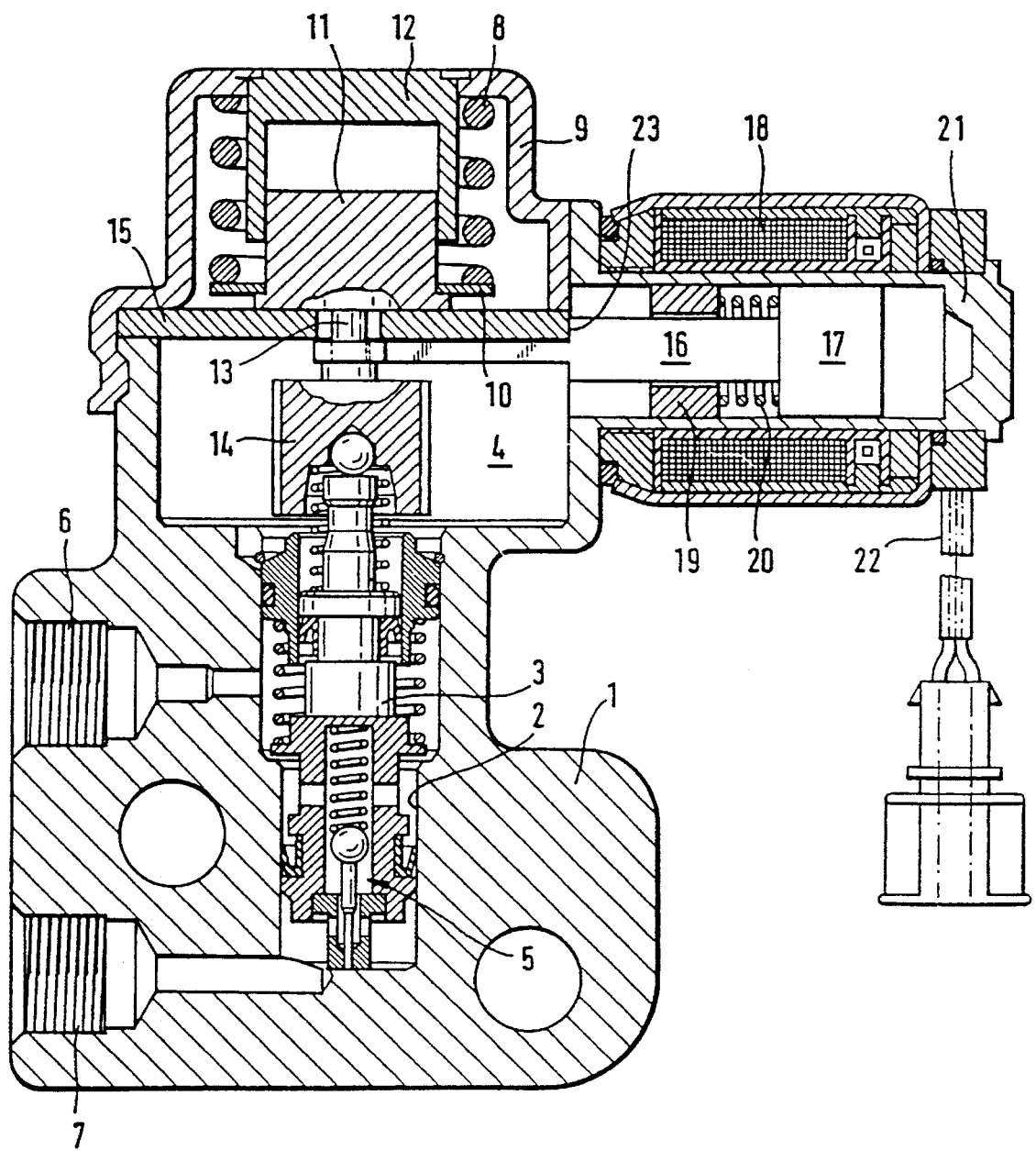
FIG. 1 is a cross-sectional view of a twin-type brake force regulator according to the present invention.

The twin-type brake force regulator, shown in FIG. 1, has in the housing 1 two stepped bores, only one of which, stepped bore 2, can be seen, while the second stepped bore is positioned congruently behind stepped bore 2. A control piston 3 is guided in the stepped bore 2 and forms a seal between stepped bore 2 and space 4, which is free from pressure fluid and subjected to atmospheric pressure. Control piston 3 accommodates control valve 5 which closes as soon as the control piston displaces a sufficient distance upwards (according to the drawing). Control valve 5 governs the connection between inlet 6 and outlet 7. As is known, the surface ratios of the control piston 3 and the force of control spring 8 dictate the outlet pressure at which control valve 5 closes for the first time. Control spring 8 is supported on a housing cover 9 at one end and acts on an annular disc 10 which abuts against a step of guide element 11. Guide element 11 is axially guided in a guide pot 12 which is rigidly coupled to housing cover 9. The guide element 11 is continued in a control tappet 13, which evenly acts on the control pistons through the beam of balance 14.

Figure 3:
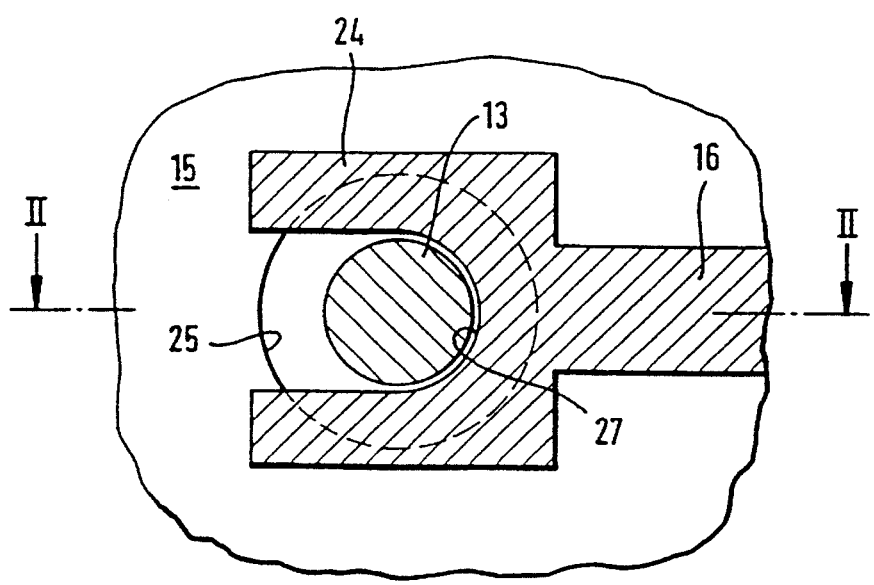
FIG. 3 is a partial cross-sectional view of the regulator in FIG. 1 in another sectional plane.

A stop plate 15 is secured to or caulked with the housing cover 9 between the guide element 11 and a beam of balance 14 so as to be formed fast with the housing. Intermediate stop plate 15 and the beam of balance 14, a locking member 16 projects radially into the space 4, where it embraces the control tappet 13 via a U-shaped portion (as best seen in FIG. 3). On its side remote from the control tappet 13, locking member 16 is rigidly coupled to a magnet armature 17. The magnet armature 17 is slidable within an electric coil 18. The axis of the electric coil 18 is aligned perpendicular to the axis of the control piston 3. A stop sleeve 19, through which the locking member 16 projects, is accommodated in the inside of the coil 18 between magnet armature 17 and space 4. Stop sleeve 19 serves to support a resetting spring 20 which urges the magnet armature 17 away from space 4 towards an end wall 21, when the coil is deenergized. The end wall 21 serves as a stop for the magnet armature 17, and closes the interior of the coil towards the outside.

The electric coil is energized by means of a cable 22. It is preferred that the current supply is controlled by the electronic controlling unit of an anti-lock brake system. With the anti-lock control system functioning properly, the electric coil 18 is energized so that the pressure reduction function is deactivated. The electric coil 18 becomes deenergized when the anti-lock system is disabled so that the magnet armature 17 is shifted by the resetting spring 20 to the end wall 21 and the control tappet 13 is released. Thus, at least pressure reduction in the rear-axle brakes is possible even upon failure of the anti-lock function.

Figure 2:
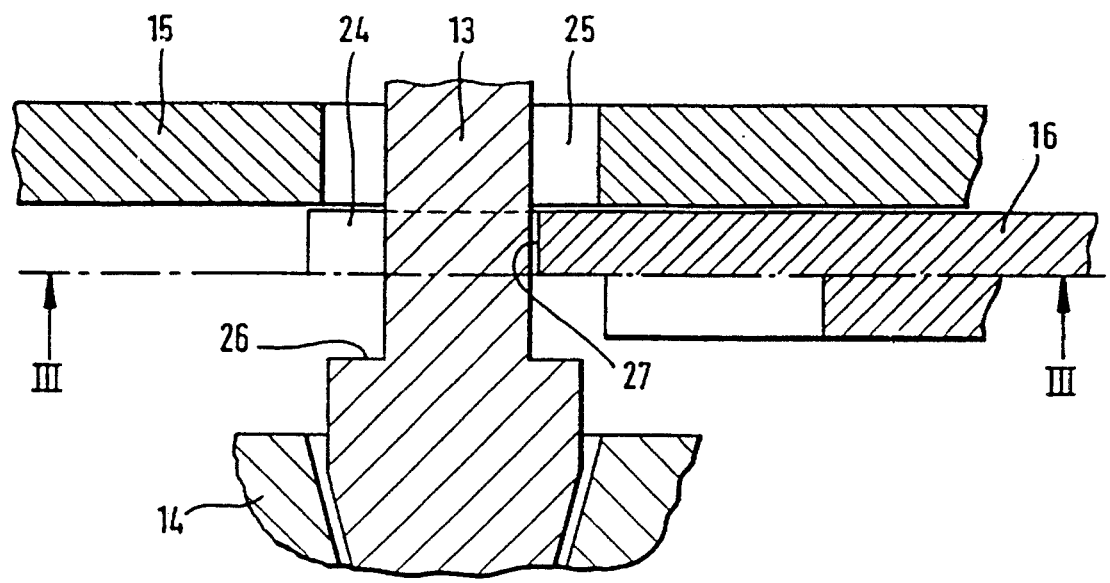
FIG. 2 is a partial cross-sectional view of the regulator in FIG. 1.

FIG. 2 is a cross-sectional view of the control tappet 13, stop plate 15 and locking member 16. Locking member 16 is shown in two different positions. The advanced position is indicated as position A (on top and to the left according to the drawing), while the retracted position is indicated as position B. The exact positioning of the locking member 16 in its advanced position A, as shown in FIG. 1, is determined by a step 23 which moves into abutment against the stop plate 15. The retracted position B of the locking member 16 is defined by the distance the magnet armature 17 covers (i.e., moves to the right, according to FIG. 1) until contacting the end wall 21.

In the advanced position, the locking member 16 is slid between the stop wall 15 and a step 26 of the control tappet 13. In this position, the arms of a fork 24, as is shown in FIG. 3, cover a central hole 25 in the stop plate 15 so that the fork 24 is protected against being deformed by forces generated by the control pistons. A curve 27 of the fork 24 adapts, by leaving a small clearance, to the circumference of the control tappet 13. Upward movement of the control tappet 13 is blocked by step 26 and locking member 16.

In the retracted position, the locking member 16 is remote from the control tappet 13 such a distance that the step 26 does not move into contact with the fork 24 and the hole 25 in the stop plate 15 is entirely open. Now, a pressure reduction function of the brake force regulator is possible.

Although the change-over pressure is not varied in the twin-type brake force regulator described in the present embodiment due to the invariably adjusted control spring 8, the invariably adjusted actuating device, which includes control spring 8, annular disc 10, guide member 11 and guide pot 12, may also be replaced by any state-of-the-art lever assembly. The mode of operation of the locking member 16 is not impaired, because the control valve 5 is permanently open in its inactive position, that means the control piston 3 is always positioned at the bottom stop. This applies also to a load-responsive actuation effected by a lever or by a hydraulic, load-responsive application of force on the control tappet 13.

I claim:

1. A brake force regulator having two bores with axes arranged in parallel in a housing, a control piston being axially slidably guided and sealed in each of the bores, comprising an actuating device having a control tappet and a beam of balance, said control tappet centrally applying an axial control force to said beam of balance, which control force is transmitted by the beam of balance to each of the control pistons; and a locking device having an electric coil, a magnet armature slidable in said coil and a locking member which is attached to and movable with said magnet armature, said locking device being so arranged that said magnet armature is radially movable with respect to the axes of the housing bores, said locking member being in positive engagement with said control tappet in an advanced position and wherein said locking member releases said control tappet in a retracted position.

2. A brake force regulator as claimed in claim 1, wherein said magnet armature places said locking member in said advanced position when said coil is energized.

3. A brake force regulator as claimed in claim 1 wherein said locking member has a U-shaped fork, at an end of said locking member toward said control tappet, said fork having an inner curve that is adapted to a diameter of the control tappet wherein said control tappet has an enlarged portion with a step directly beneath a point of engagement towards said beam of balance.

4. A locking device for use in a brake force regulator having a control tappet that moves along a tappet axis to enable the regulator to perform a pressure reduction function, comprising:

an electric coil;

a magnet armature slidably disposed within said coil; and a locking member coupled to said magnet armature such that said locking member is moveable with said armature in a direction perpendicular to the tappet axis, said locking member engaging the control tappet in a first locking member position and not engaging the control tappet in a second locking member position, said first locking member position corresponding to a condition in which the brake force regulator is unable to perform the pressure reduction function.

5. The device of claim 4, wherein said locking member has a fork at an end of said locking member distal from said armature, said fork engaging a portion of the control tappet when said locking member is in said first position.

6. The device of claim 5, wherein said fork has a generally U-shaped portion adapted to accommodate a portion of the control tappet when said locking member is in said first position.

7. The device of claim 4, wherein said locking member is maintained in said first position when said coil is energized.

8. A brake force regulator suitable for use in a vehicle antilocking brake system, comprising:

a control tappet that moves along a tappet axis to enable the regulator to perform a pressure reduction function;

an electric coil having a magnet armature that is slidably disposed within said coil and arranged such that said armature slides in a direction perpendicular to said tappet axis; and a locking member coupled to and moveable with said magnet armature into first and second positions, respectively, said locking member engaging a portion of said control tappet in said first position such that said control tappet is restricted from movement along said tappet axis and the regulator is thereby unable to perform the pressure reduction function, said locking member not engaging said control tappet in said second position.

9. The brake force regulator of claim 8, wherein said control tappet has a cylindrical portion with a nominal radius at one end of said tappet and a step adjacent said cylindrical portion, said step having a second radius that is larger than said nominal radius.

10. The brake force regulator of claim 9, wherein said locking member has a fork at an end distal from said armature, said fork having an inner curve that is adapted to receive said tappet cylindrical portion, said fork engaging said step when said locking member is in said first position.

11. The brake force regulator of claim 8, wherein said locking member has a fork at an end distal from said armature, said fork engaging a portion of said tappet when said locking member is in said first position.

12. The brake force regulator of claim 11, wherein said control tappet has a step defined near one end of said tappet that abuttingly engages two arms on said fork when said locking member is in said first position, said tappet further comprising an extension portion that is received within a central portion of said fork when said step abuttingly engages said arms.

13. The brake force regulator of claim 8, wherein said locking member is maintained in said first position when said coil is energized.

* * * * *